(12) United States Patent
Namekawa et al.

(10) Patent No.: US 12,267,010 B2
(45) Date of Patent: Apr. 1, 2025

(54) SWITCHING POWER CIRCUIT

(71) Applicants: Kabushiki Kaisha Toshiba, Tokyo (JP); Toshiba Electronic Devices & Storage Corporation, Tokyo (JP)

(72) Inventors: Toshimasa Namekawa, Ota Tokyo (JP); Ryoma Matsuo, Kawasaki Kanagawa (JP); Katsumasa Tanaka, Nagareyama Chiba (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 156 days.

(21) Appl. No.: 18/099,172

(22) Filed: Jan. 19, 2023

(65) Prior Publication Data
US 2023/0155501 A1 May 18, 2023

Related U.S. Application Data

(62) Division of application No. 16/806,269, filed on Mar. 2, 2020, now Pat. No. 11,594,963.

(30) Foreign Application Priority Data

Sep. 4, 2019 (JP) .................. 2019-161370

(51) Int. Cl.
*H02M 3/157* (2006.01)
*H02M 1/32* (2007.01)
*H02M 3/158* (2006.01)

(52) U.S. Cl.
CPC ............. *H02M 3/157* (2013.01); *H02M 1/32* (2013.01); *H02M 3/158* (2013.01)

(58) Field of Classification Search
CPC ......... H02M 3/157; H02M 1/32; H02M 3/158
See application file for complete search history.

(56) References Cited

U.S. PATENT DOCUMENTS

| | | | |
|---|---|---|---|
| 6,204,571 B1 | 3/2001 | Higashi et al. | |
| 7,772,811 B1 | 8/2010 | Jain et al. | |
| 10,871,793 B2 | 12/2020 | Namekawa et al. | |
| 2005/0010826 A1 | 1/2005 | Pullen et al. | |
| 2007/0262763 A1 | 11/2007 | Suzuki | |
| 2009/0102444 A1 | 4/2009 | Nonaka | |
| 2009/0309563 A1 | 12/2009 | Noda | |
| 2013/0069613 A1* | 3/2013 | Nakase | H02M 3/156 323/284 |
| 2013/0307490 A1 | 11/2013 | Amemiya et al. | |
| 2016/0011610 A1* | 1/2016 | Hayashi | H03K 17/162 323/280 |
| 2016/0360582 A1* | 12/2016 | Kato | H02M 1/32 |

(Continued)

FOREIGN PATENT DOCUMENTS

| | | |
|---|---|---|
| JP | S62-016066 A | 1/1987 |
| JP | 2006-347504 A | 12/2006 |

(Continued)

*Primary Examiner* — Rafael O De Leon Domenech
(74) *Attorney, Agent, or Firm* — Kim & Stewart LLP

(57) ABSTRACT

According to one embodiment, a switching power circuit compares a reference voltage with a feedback voltage of an output voltage, and controls the output voltage in accordance with the reference voltage, in which in a case where the output current is greater than a predetermined set current, the voltage of the reference voltage is decreased.

8 Claims, 8 Drawing Sheets

(56) References Cited

U.S. PATENT DOCUMENTS

| | | |
|---|---|---|
| 2018/0278045 A1 | 9/2018 | Watanabe |
| 2019/0086943 A1 | 3/2019 | Namekawa et al. |
| 2020/0304034 A1 | 9/2020 | Namekawa |
| 2021/0083574 A1 | 3/2021 | Namekawa et al. |
| 2021/0091656 A1 | 3/2021 | Namekwa |

FOREIGN PATENT DOCUMENTS

| | | |
|---|---|---|
| JP | 2007-336748 A | 12/2007 |
| JP | 2011-030376 A | 2/2011 |
| JP | 2017-158399 A | 9/2017 |
| JP | 2018-078687 A | 5/2018 |
| JP | 2018-129909 A | 8/2018 |
| JP | 2018-133915 A | 8/2018 |
| JP | 2018-164394 A | 10/2018 |
| JP | 2019-056982 A | 4/2019 |
| JP | 2020-156215 A | 9/2020 |
| JP | 2021-045021 A | 3/2021 |
| JP | 2021-048727 A | 3/2021 |

\* cited by examiner

SWITCHING POWER CIRCUIT

CROSS-REFERENCE TO RELATED APPLICATIONS

This application is a divisional of application Ser. No. 16/806,269 filed Mar. 2, 2020 and is based upon and claims the benefit of priority from Japanese Patent Application No. 2019-161370, filed on Sep. 4, 2019; the entire contents of which are incorporated herein by reference.

FIELD

Embodiments described herein relate generally to a switching power circuit.

BACKGROUND

Conventionally, in a switching power circuit that performs voltage feedback control such that a feedback voltage is identical to a reference voltage, a configuration having an overcurrent protection function is known. In the overcurrent protection, for example, a switching transistor is turned off by the voltage feedback control, at the time of detecting an overcurrent in an overload state. However, in a case where the voltage feedback control is stopped at the time of the overcurrent protection, an output voltage is unstable, and thus, the operation of a device to which the output voltage is supplied is also unstable. For this reason, a switching power circuit that is capable of supplying a stable output voltage even during an overcurrent protection operation, and is capable of instantaneously returning to a normal state when an overload state is released is desired.

DETAILED DESCRIPTION

In general, according to one embodiment, a switching power circuit compares a reference voltage with a feedback voltage of an output voltage, and controls the output voltage, in accordance with the reference voltage, in which in a case where the output current is greater than a predetermined set current, a voltage of the reference voltage is decreased.

Exemplary embodiments of a switching power circuit will be explained below in detail with reference to the accompanying drawings. Note that, the present invention is not limited to the following embodiments.

First Embodiment

Figure 1:
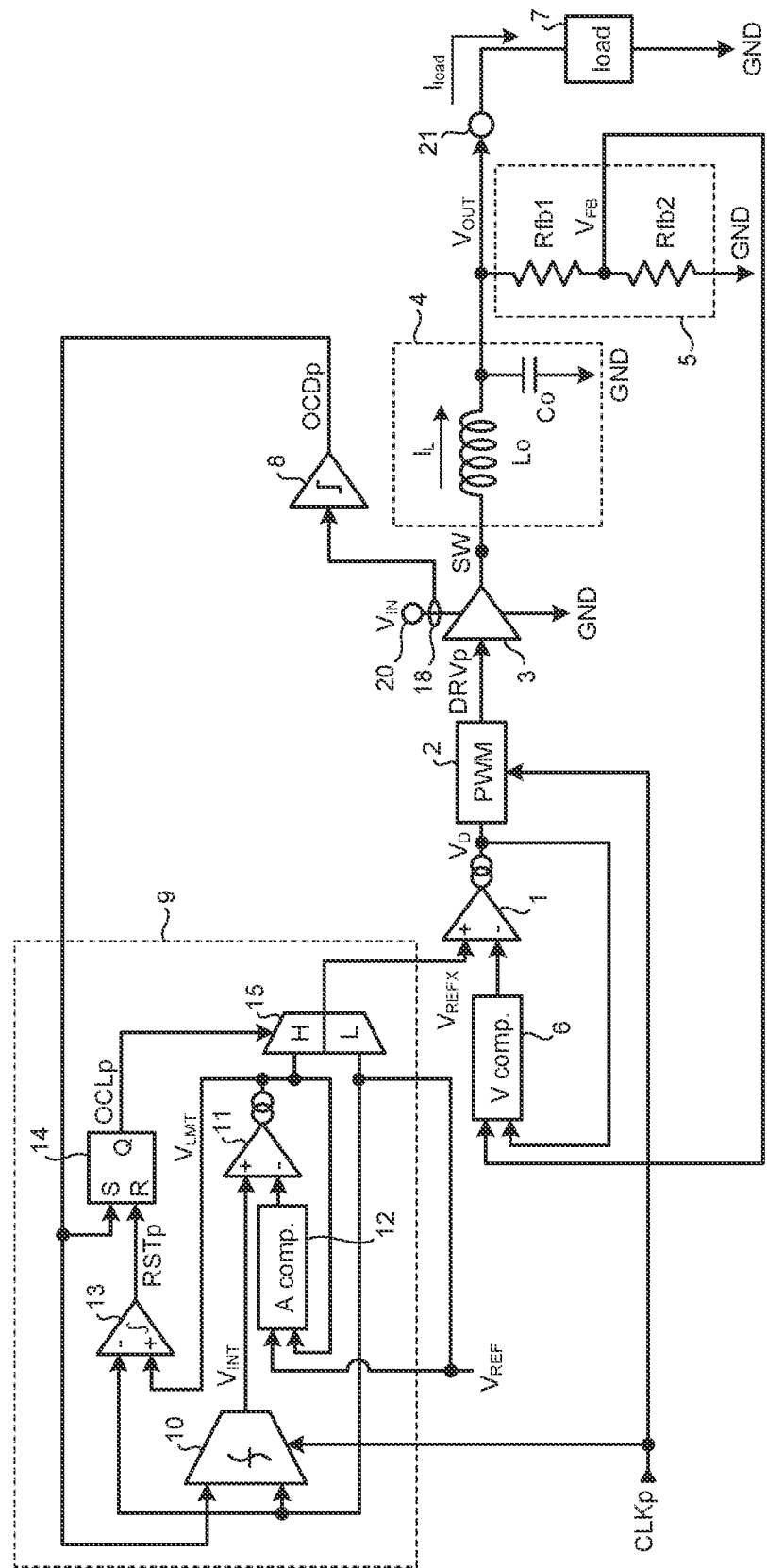
FIG. 1 is a diagram illustrating a configuration of a switching power circuit of a first embodiment.

FIG. 1 is a diagram illustrating the configuration of a switching power circuit of a first embodiment. The switching power circuit of this embodiment is a step-down type switching power circuit having an overcurrent protection function. A direct-current input voltage $V_{IN}$ is supplied to an input terminal 20, and a direct-current output voltage $V_{OUT}$ is output from an output terminal 21.

In an error amplifier 1, a feedback voltage $V_{FB}$ is supplied to an inversion input end (−) through a voltage loop phase compensation device 6, and a reference voltage signal $V_{REFX}$ is supplied to a non-inversion input end (+). The error amplifier 1 performs voltage feedback control for allowing the feedback voltage $V_{FB}$ to follow the reference voltage signal $V_{REFX}$. The error amplifier 1 outputs an instruction voltage VD according to a differential voltage between the reference voltage signal $V_{REFX}$ and the feedback voltage $V_{FB}$ to a pulse width modulator 2.

The pulse width modulator 2 generates a sawtooth wave signal in response to a clock signal CLKp at a predetermined frequency, compares the sawtooth wave signal with the instruction voltage VD, and generates a driving signal DRVp by pulse width modulation (PWM). The driving signal DRVp is supplied to a driver circuit 3. A duty ratio of the driving signal DRVp is changed in accordance with the instruction voltage VD. For example, in a case where the value of the instruction voltage VD increases, a Hi period of the driving signal DRVp shortens.

The driver circuit 3 is connected between the input terminal 20 to which the input voltage $V_{IN}$ is applied and a ground GND, and supplies a current to a low-pass filter 4 through a node SW. The driver circuit 3 includes a series circuit of a switching transistor (not illustrated) of which On/Off is controlled by the driving signal DRVp, and a diode (not illustrated).

The low-pass filter 4 includes an inductor Lo and an output capacitance Co that are connected in series between the node SW and the ground GND. A connection point between the inductor Lo and the output capacitance Co is connected to the output terminal 21. The inductor current $I_L$ flows to the inductor Lo. The inductor current $I_L$ is smoothened, and the current that is output from the driver circuit 3 is output from the output terminal 21 as a load current $I_{load}$. For descriptive purposes, the term of an output current may be used as a collective term of the current that is output from the driver circuit 3, the inductor current $I_L$, and the load current $I_{load}$.

A resistance voltage divider 5 is connected between the output terminal 21 of the output voltage $V_{OUT}$ and the ground GND, and includes a series circuit of a resistance Rfb1 and a resistance Rfb2. The resistance voltage divider 5 generates the feedback voltage $V_{FB}$ in which the output voltage $V_{OUT}$ is divided by the resistances Rfb1 and Rfb2, and supplies the feedback voltage $V_{FB}$ to the voltage loop phase compensation device 6. The feedback voltage $V_{FB}$ is set by a resistance ratio of the output voltage $V_{OUT}$ and the resistances Rfb1 and Rfb2.

In a load 7, one end is connected to the output terminal 21, and the other end is connected to the ground GND. The load current $I_{load}$ is supplied to the load 7. For example, the load current $I_{load}$ is changed in accordance with a change in a resistance value of the load 7.

In this embodiment, an overcurrent sensing device 8 that senses a current flowing to the driver circuit 3 is provided. By sensing the current flowing to the driver circuit 3, it is possible to sense the state of the load current $I_{load}$. The overcurrent sensing device 8 compares an output signal from a current sensor 18 that senses the current flowing to the driver circuit 3 with a predetermined set current value, and outputs a Hi overcurrent sensing signal OCDp indicating that an overcurrent state is set when the output signal from the current sensor 18 is greater than the set current value, to the overcurrent protection circuit 9.

The overcurrent protection circuit 9 includes an integrator 10 to which the clock signal CLKp and the overcurrent sensing signal OCDp are supplied, a differential amplifier 11, a current loop phase compensation device 12, a comparison circuit 13, a latch circuit 14, and a selection switch 15.

The clock signal CLKp and the overcurrent sensing signal OCDp are supplied to the integrator 10, and the integrator generates an integral signal $V_{INT}$ that is changed in accordance with the number of clock signals CLKp during a predetermined period of the overcurrent sensing signal OCDp. The integrator 10, for example, outputs the integral signal $V_{INT}$ of which the voltage decreases in accordance with the number of clock signals CLKp when the overcurrent sensing signal OCDp is in a Hi period, and the voltage increases in accordance with the number of clock signals CLKp when the overcurrent sensing signal OCDp is in a Low period.

The differential amplifier 11 amplifies a voltage difference between the integral signal $V_{INT}$ and a fixed reference voltage $V_{REF}$, and outputs a protection voltage $V_{LMT}$. The protection voltage $V_{LMT}$ is supplied to the current loop phase compensation device 12, the comparison circuit 13, and the selection switch 15. The protection voltage $V_{LMT}$ is fed back to an inversion input end (−) of the differential amplifier 11 through the current loop phase compensation device 12, and thus, the differential amplifier 11 is operated such that the protection voltage $V_{LMT}$ is identical to the integral signal $V_{INT}$.

In the comparison circuit 13, the protection voltage $V_{LMT}$ is applied to a non-inversion input end (+), and the fixed reference voltage $V_{REF}$ is supplied to an inversion input end (−). In a case where the protection voltage $V_{LMT}$ is higher than the fixed reference voltage $V_{REF}$, the comparison circuit 13 outputs a reset signal RSTp.

In the latch circuit 14, the reset signal RSTp is supplied to a reset terminal R, and the overcurrent sensing signal OCDp is supplied to a set terminal S. The latch circuit 14 outputs the overcurrent protection signal OCLp that is set by the overcurrent sensing signal OCDp to be at Hi and is reset by the reset signal RSTp to be at Low to the selection switch 15.

The selection switch 15 selects the protection voltage $V_{LMT}$ when the overcurrent protection signal OCLp is at Hi and selects the fixed reference voltage $V_{REF}$ when the overcurrent protection signal OCLp is at Low, to be output as the reference voltage signal $V_{REFX}$. The reference voltage signal $V_{REFX}$ is supplied to the non-inversion input end (+) of the error amplifier 1.

Figure 2:
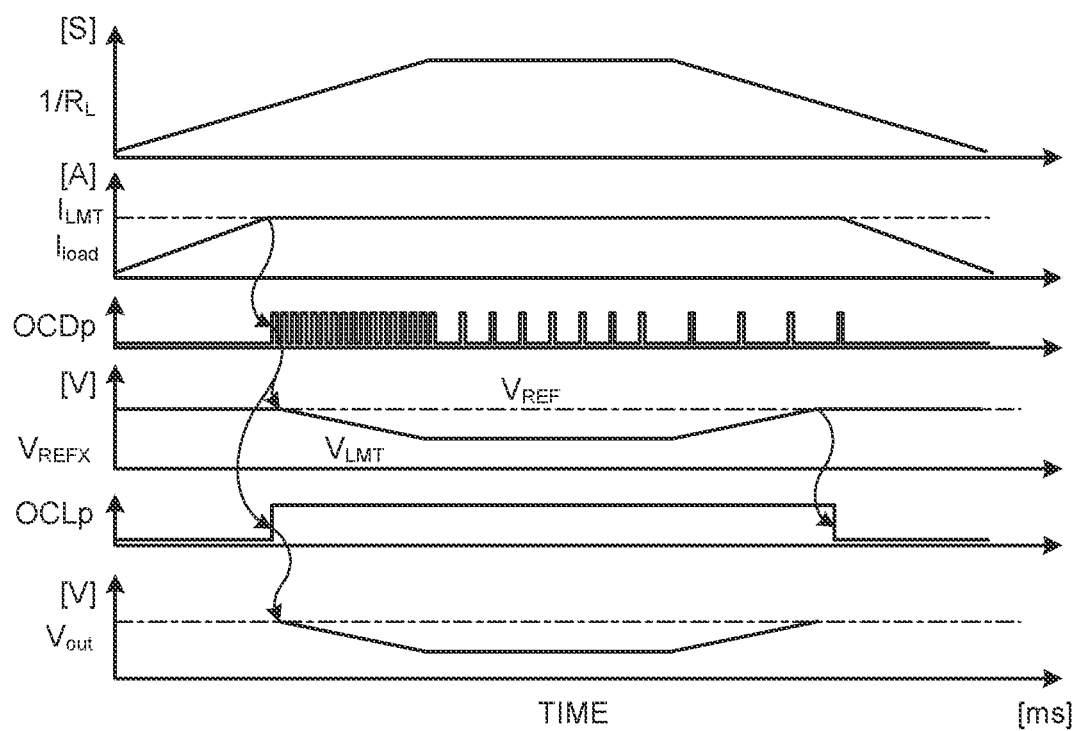
FIG. 2 is a waveform diagram schematically illustrating an operation of the switching power circuit of the first embodiment.

FIG. 2 is a diagram schematically illustrating an operation waveform of the switching power circuit of the first embodiment. A horizontal axis represents a time, and the following operation waveforms are respectively illustrated.

The load 7 (=1/$R_L$) is illustrated on the first line. For descriptive purposes, a case is illustrated in which the load 7 is a resistance load. The load 7 increases from a comparatively light state as time elapses, and retains a heavy state for a constant time, and then, returns again to a light state at the same rate.

An increase or decrease in the load current $I_{load}$ is illustrated on the next line. The load current $I_{load}$ increases as the load 7 increases. However, in a case where the load current reaches a limited current $I_{LMT}$ set in advance, the load current $I_{load}$ is controlled such that the load current is not greater than the limited current $I_{LMT}$. After that, in a case where the load 7 decreases, the load current $I_{load}$ decreases.

The overcurrent sensing signal OCDp is illustrated on the next line. The overcurrent sensing signal OCDp is a logic signal that is at Hi in a case where the load current $I_{load}$ is greater than the limited current $I_{LMT}$ set in advance. The overcurrent sensing signal OCDp is a pulse signal that is at Hi or Low for each switching cycle of the switching transistor (not illustrated) of the driver circuit 3. The switching cycle of the switching transistor is controlled by the frequency of the clock signal CLKp.

The reference voltage signal $V_{REFX}$ is illustrated on the next line. The reference voltage signal $V_{REFX}$ is switched to the protection voltage $V_{LMT}$ (a solid line) that is changed in accordance with the load current $I_{load}$ in the overcurrent state, from the fixed reference voltage $V_{REF}$ (a dashed-dotted line) in a normal state. The protection voltage $V_{LMT}$ decreases in accordance with the number of times that the output current is greater than the set value. A frequency that the overcurrent sensing signal OCDp is at Hi is proportional to an increase or decrease rate of the load, and when the load increases, the frequency that the overcurrent sensing signal OCDp is at Hi increases, and when the load decreases, the frequency that the overcurrent sensing signal OCDp is at Hi decreases. In accordance with such a frequency, the voltage of the protection voltage $V_{LMT}$ is changed, and thus, the voltage of the reference voltage signal $V_{REFX}$ is changed.

The overcurrent protection signal OCLp is illustrated on the next line. The overcurrent protection signal OCLp is set at Hi in a case where the overcurrent sensing signal OCDp is at Hi, and is reset at Low in a case where the protection voltage $V_{LMT}$ is higher than the fixed reference voltage $V_{REF}$. The output voltage $V_{OUT}$ is illustrated on the last line. The output voltage $V_{OUT}$ is changed following the reference voltage signal $V_{REFX}$, by the voltage feedback control.

According to this embodiment, when the overcurrent protection signal OCLp is at Hi, that is, in a case where the current flowing through the driver circuit 3 is in the overcurrent state, the voltage that is supplied to the non-inversion input end (+) of the error amplifier 1 is switched to the protection voltage $V_{LMT}$ from the fixed reference voltage $V_{REF}$. For this reason, a voltage feedback control loop including the error amplifier 1 performs control in which the feedback voltage $V_{FB}$ is decreased following the reference voltage signal $V_{REFX}$. That is, control is performed in which the output voltage $V_{OUT}$ is decreased. According to such control, the output current is suppressed, and thus, it is possible to avoid a state in which the overcurrent state continues.

The overcurrent protection starts at a timing when the overcurrent protection signal OCLp is at Hi, and continues to a timing when the overcurrent protection signal OCLp is at Low. However, even in a protection period, the voltage feedback control is constantly operated, and thus, the output voltage $V_{OUT}$ is stable. Accordingly, the operation of a device to which the output voltage $V_{OUT}$ is supplied is stable. In addition, in a case where the overcurrent state is released, the reference voltage signal $V_{REFX}$ is instantaneously switched to the fixed reference voltage $V_{REF}$, and thus, overshoot does not occur in which the output voltage $V_{OUT}$ is greater than the fixed reference voltage $V_{REF}$ and abnormally increases.

In the switching power circuit of this embodiment, overcurrent control is performed such that the load current $I_{load}$ is not greater than the limited current set in advance, and thus, the output voltage $V_{OUT}$ is decreased. The output current can be suppressed by performing voltage control to follow the protection voltage $V_{LMT}$, and thus, the overcurrent protection function can be provided. In addition, in such overcurrent protection, the voltage feedback control is continuously operated, and thus, the output voltage $V_{OUT}$ is stable, and the overshoot does not occur.

In addition, the overcurrent sensing signal OCDp is a binary digital signal. By the integrator 10, the overcurrent sensing signal OCDp that is the digital signal is converted to the integral signal $V_{INT}$ that is an analog signal, and thus, the current loop phase compensation device 12 configured of an analog filter, and the differential amplifier 11 can be provided.

Second Embodiment

Figure 3:
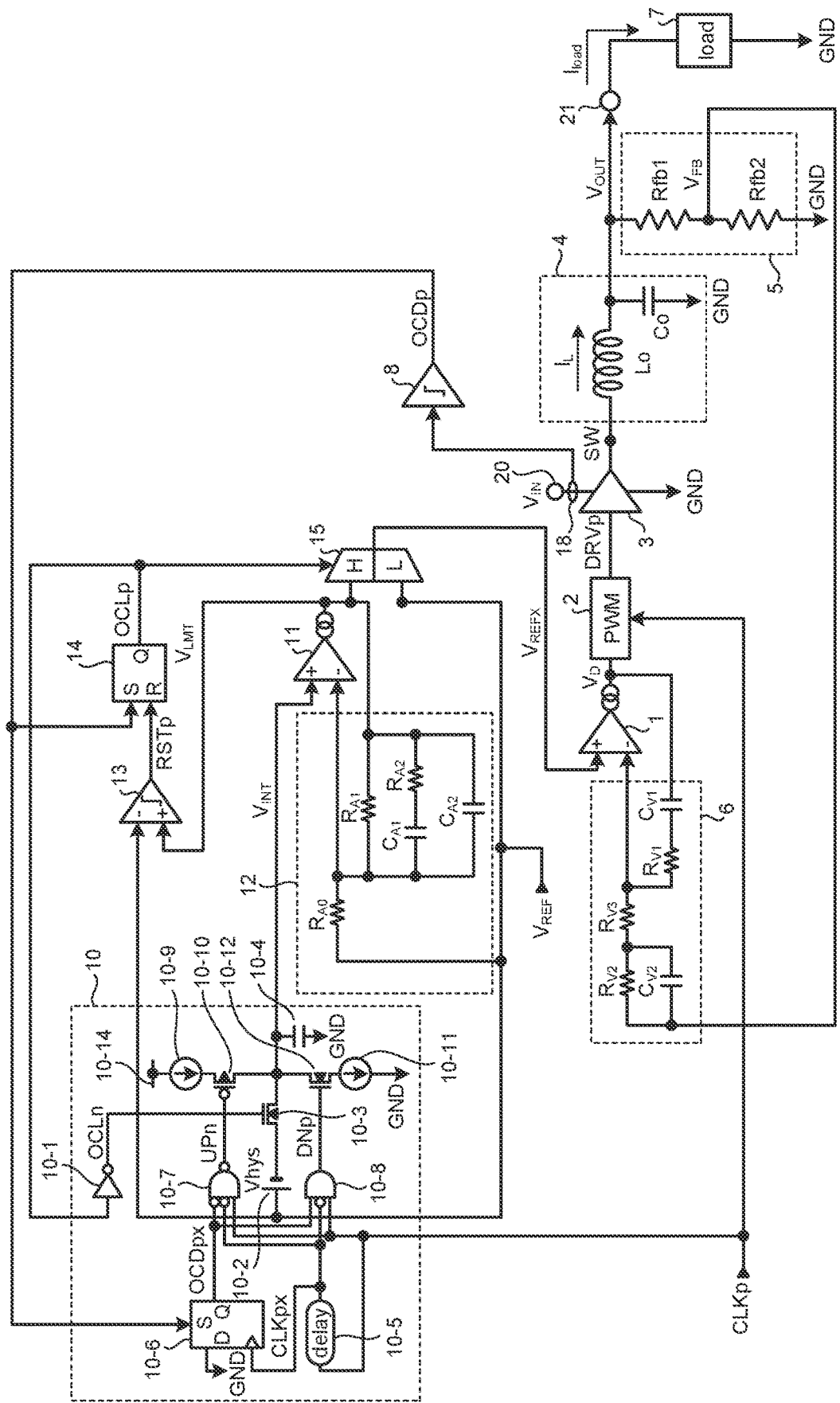
FIG. 3 is a diagram illustrating a configuration of a switching power circuit of a second embodiment.

FIG. 3 is a diagram illustrating a switching power circuit of a second embodiment. The same reference numerals will be applied to configurations corresponding to the first embodiment, and the repeated description will be made when absolutely necessary. The same applies to the followings. In the switching power circuit of this embodiment, the more detailed configuration of the voltage loop phase compensation device 6, the integrator 10, and the current loop phase compensation device 12 will be described.

The feedback voltage $V_{FB}$ is supplied to the inversion input end (−) of the error amplifier 1 through the voltage loop phase compensation device 6. The voltage loop phase compensation device 6 is a two-pole two-zero type analog filter including three resistances $R_{v1}$, $R_{v2}$, and $R_{v3}$ and two capacitances CV1 and $C_{v2}$.

The integrator 10 includes an inverter 10-1 that generates an inversion signal OCLn of the overcurrent protection signal OCLp. The inversion signal OCLn is supplied to a gate of an NMOS transistor 10-3. In the NMOS transistor 10-3, a voltage source 10-2 is connected to a source, and one end of a capacitance 10-4 is connected to a drain. The other end of the capacitance 10-4 is connected to the ground GND. The NMOS transistor 10-3 outputs a voltage that is a hysteresis voltage Vhys lower than the fixed reference voltage $V_{REF}$, in response to the inversion signal OCLn. The integral signal $V_{INT}$ of the integrator 10 is supplied to a non-inversion input end (+) of the differential amplifier 11.

In a flip-flop 10-6, the overcurrent sensing signal OCDp is supplied to a set terminal 5, a data input terminal D is connected to the ground GND, and the clock signal CLKp is supplied to a clock terminal through a delay circuit 10-5. The delay circuit 10-5 outputs a delay clock signal CLKpx by adding a short time delay to the clock signal CLKp. The flip-flop 10-6 outputs an overcurrent detection synchronous signal OCDpx from an output terminal Q, on the basis of the overcurrent sensing signal OCDp and the delay clock signal CLKpx. When the delay clock signal CLKpx is at Hi, the overcurrent detection synchronous signal OCDpx is at Low, in accordance with the voltage of the ground GND of the data input terminal D, and in a case where the overcurrent sensing signal OCDp that is supplied to the set terminal S is at Hi, the overcurrent detection synchronous signal OCDpx is at Hi.

The integrator 10 includes a charge pulse generation device 10-7. When the overcurrent detection synchronous signal OCDpx is at Low, the charge pulse generation device 10-7 generates a charge pulse signal UPn that is at Hi at a timing when the clock signal CLKp is transitioned to Hi, and is at Low at a timing when the delay clock signal CLKpx is transitioned to Hi.

The charge pulse signal UPn is supplied to a gate of a PMOS transistor 10-10. In the PMOS transistor 10-10, the output of a charge constant current source 10-9 is connected to a source, and the capacitance 10-4 is connected to a drain. The other end of the charge constant current source 10-9 is connected to a power source line 10-14.

The integrator 10 includes a discharge pulse generation device 10-8. When the overcurrent detection synchronous signal OCDpx is at Hi, the discharge pulse generation device 10-8 generates a discharge pulse signal DNp that is at Hi at a timing when the clock signal CLKp is transitioned to Hi, and is at Low at a timing when the delay clock signal CLKpx is transitioned to Hi. That is, when the overcurrent state is sensed, and the overcurrent sensing signal OCDp is at Hi, the discharge pulse signal DNp is at Hi.

The discharge pulse signal DNp is supplied to a gate of an NMOS transistor 10-12. In the NMOS transistor 10-12, the capacitance 10-4 is connected to a drain, and the output of a discharge constant current source 10-11 is connected to a source. The other end of the discharge constant current source 10-11 is connected to the ground GND.

When the PMOS transistor 10-10 is turned on, the capacitance 10-4 is charged by the charge constant current source 10-9, and when the NMOS transistor 10-12 is turned on, the capacitance 10-4 is discharged by the discharge constant current source 10-11. A frequency that the discharge pulse signal DNp is at Hi is proportional to the frequency that the overcurrent sensing signal OCDp is at Hi. The integrator 10 integrates the number of times that the overcurrent sensing signal OCDp is at Hi, generates the integral signal $V_{INT}$ that is changed in accordance with a result thereof, and outputs the integral signal. The integral signal $V_{INT}$ increases as the capacitance 10-4 is charged, and decreases as the capacitance 10-4 is discharged. Accordingly, various configurations can be made in which the reference voltage signal $V_{REFX}$ is changed in accordance with the number of counts of the overcurrent sensing signal OCDp, in the overcurrent state, without being limited to the embodiments described above.

The current loop phase compensation device 12 is a two-pole one-zero type analog filter including three resistances $R_{A0}$, $R_{A1}$, and $R_{A2}$ and two capacitances $C_{A1}$ and $C_{A2}$. The current loop phase compensation device 12 configures three-pole one-zero type filter, along with the integrator 10.

Figure 4:
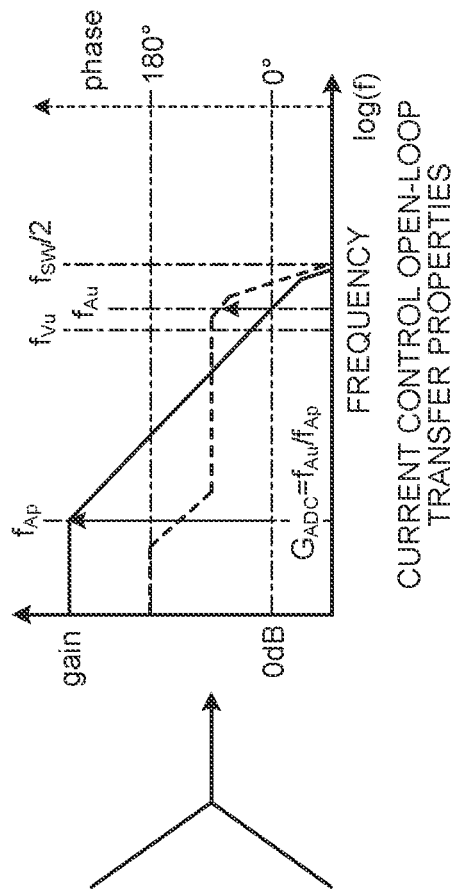
FIG. 4 is a diagram illustrating transfer properties of a current feedback loop of the second embodiment.
Figure 4:
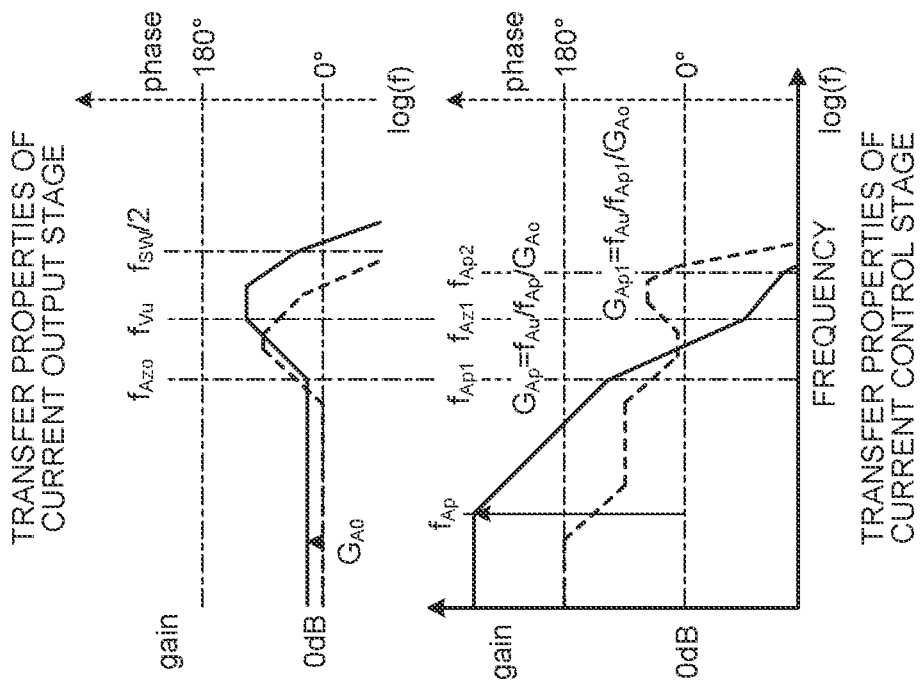

FIG. 4 is a Bode diagram illustrating open-loop transfer frequency properties of an overcurrent control system. An upper left side illustrates transfer properties of a current output stage to the overcurrent sensing signal OCDp from the reference voltage signal $V_{REFX}$. A lower left side illustrates transfer properties of a current control stage to the reference voltage signal $V_{REFX}$ from the overcurrent sensing signal OCDp, including the current loop phase compensation device 12. Here, a design target is to synthesize the transfer properties illustrated on the upper left side and the lower left side, and thus, to obtain current control open-loop transfer properties illustrated on a right side of the same drawing.

Gain properties of an open-loop transfer function of the overcurrent control system that are the design target are illustrated by a solid line, and phase properties thereof are illustrated by a broken line, on the right side. In order to stabilize the output voltage at the time of the overcurrent control, current loop phase compensation device 12 and the integrator 10 are designed such that the open-loop transfer properties are regarded as a primary lowpass amplifier in which a gain is 0 dB by a unity gain frequency $f_{Au}$.

First, the product of a main pole frequency $f_{Ap}$ and a DC gain $G_{ADC}$ is set to be identical to the unity gain frequency $f_{Au}$ (Expression (1)).

$$f_{Au} = G_{ADC} \cdot f_{Ap} \quad (1)$$

Here, when the overcurrent state is sensed, it is necessary to instantaneously control the inductor current $I_L$ such that the inductor current is not greater than the limited current $I_{LMT}$. For this reason, the unity gain frequency $f_{Au}$ is set to a value that is approximately identical to or slight greater than a voltage control unity gain frequency $f_{Vu}$. However, it is necessary to set the unity gain frequency $f_{Au}$ to be sufficiently lower than a switching frequency $f_{SW}$ such that the control is not unstable due to the influence of a phase lag of a sampling effect associated with a switching operation. In addition, the target of a phase margin $q_{Am}$ is set to 72 degrees such that the phase margin $q_{Am}$ falls within a range of greater than or equal to 45 degrees and less than or equal to 100 degrees, in all operation conditions.

Gain properties of the output stage are illustrated by a solid line, and phase properties of the output stage are illustrated by a broken line, on the upper left side. Here, in order to obtain the transfer properties of the output stage, the overcurrent sensing device 8 is regarded as an analog current voltage amplifier, and the gain thereof is set to $V_{REF}/I_{LMT}$.

In the transfer properties of the output stage to the overcurrent sensing signal OCDp from the reference voltage signal $V_{REFX}$, having an overcurrent control effect, a zero due to the output capacitance Co and the load resistance $R_L$, and a pole of a voltage control stage appear. A zero frequency $f_{Az0}$ of the output stage is represented by the output capacitance Co and the load resistance $R_L$ (Expression (2)). Accordingly, a low-frequency gain $G_{A0}$ of the output stage at a frequency lower than the zero frequency $f_{Az0}$ is represented by a voltage dividing ratio $\beta$ of the resistance voltage divider 5, the load resistance $R_L$, and the gain $(=V_{REF}/I_{LMT})$ of the overcurrent sensing device 8 (Expression (3)).

$$f_{Az0} = 1/2\pi \cdot Co \cdot R_L \quad (2)$$

[Expression 1]

$$G_{A0} = \frac{dI_L}{dV_{REF}} \cdot \frac{V_{REF}}{I_{lmt}} \quad (3)$$

$$= \frac{1}{\beta \cdot R_L} \cdot \frac{V_{REF}}{I_{lmt}}$$

For example, when Output Capacitance Co=220 µF and the resistance voltage divider 5 of Voltage Dividing Ratio $\beta=\frac{1}{3}$ are connected to each other, and the output voltage $V_{OUT}$ of a voltage of Output Voltage $V_{OUT}=3.3$ V is obtained by applying a reference voltage of $V_{REF}=1.1$ V, in a case where the load resistance $R_L$ $(=V_{OUT}/5A=660$ mΩ) is connected not to be greater than Limited Current $I_{LMT}=5$ A, the zero frequency $f_{Az0}$ of the output stage is 1.1 kHz, and the low-frequency gain $G_{A0}$ is 1, that is, 0 dB. In addition, the pole that appears in the transfer properties of the output stage is caused by the voltage feedback control, and thus, the voltage control unity gain frequency $f_{Vu}$ is 18 kHz.

Gain properties of the current control stage are illustrated by a solid line, and phase properties of the current control stage are illustrated by a broken line, on the lower left side. A design procedure of the current control stage will be described by using the drawing. First, a main pole is provided. A gain $G_{Ap}$ at the main pole frequency $f_{Ap}$ is set such that the unity gain frequency $f_{Au}$ is approximately identical to the voltage control unity gain frequency $f_{Vu}$. Here, a gain bandwidth product to a first pole frequency $f_{Ap1}$ from the main pole frequency $f_{Ap}$ of the current control stage is constant, and thus, the first pole frequency $f_{Ap1}$ and a gain $G_{Ap1}$ thereof are set, instead of setting the main pole frequency $f_{Ap}$ of the current control stage and the gain $G_{Ap}$ thereof (Expression (4)).

[Expression 2]

$$f_{Au} = f_{Vu} \quad (4)$$

$$= G_{A0} \cdot G_{Ap} \cdot f_{Ap}$$

$$= G_{A0} \cdot G_{Ap1} \cdot f_{Ap1}$$

For example, in the step-down type switching power circuit, the first pole frequency $f_{Ap1}$ of the control stage is set to the same frequency as that of the zero of the output stage, such as 1.1 KHz that is identical to the zero frequency $f_{Az0}$ of the output stage, and the gain $G_{Ap1}$ at the pole frequency of the control stage is set to $f_{Au}/f_{Ap1}/G_{A0}=18$ kHz/1.1 kHz/1=16.4=24.3 dB.

As described above, the unity gain frequency $f_{Au}$ is set to be approximately identical to the voltage control unity gain frequency $f_{Vu}$, and thus, it is possible to configure a safe overcurrent protection function that instantaneously reacts with respect to a rapid load variation, is stably operated even in a case where an overload state continues, and does not cause the overshoot of the output voltage even in a case where the load returns to the normal state.

However, the overcurrent sensing signal OCDp that is the output of the overcurrent sensing device 8 is a binary digital signal that is sampled by the switching frequency $f_{SW}$, is at Hi at the time of the overcurrent state, and is at Low, otherwise. The current loop phase compensation device 12 that is the analog filter and the differential amplifier 11 are not capable of handling such a digital signal.

Therefore, the overcurrent sensing signal OCDp that is a digital signal is converted to the integral signal $V_{INT}$ that is an analog signal by the integrator 10. At this time, a gain bandwidth $GB_{int}$ of the integrator 10 is set by a clock delay time $t_{CKD}$ of the delay circuit 10-5, a charge current $I_{up}$ of the charge constant current source 10-9, a discharge current $I_{dn}$ of the discharge constant current source 10-11, and a capacitance value $C_{int}$ of the capacitance 10-4 (Expression (5)).

[Expression 3]

$$GB_{int} = \frac{f_{sw} \cdot t_{CKD} \cdot I_{up}}{C_{int} \cdot V_{REF}} \quad (5)$$

$$= \frac{f_{sw} \cdot t_{CKD} \cdot I_{dn}}{C_{int} \cdot V_{REF}}$$

For example, in the step-down type switching power circuit, in a case where the switching frequency $f_{SW}$ is 500 kHz, the clock delay time $t_{CKD}$ is 1.1 nS, the charge current $I_{up}$ and the discharge current $I_{dn}$ are 1 µA, and the capacitance value $C_{int}$ is 0 pF, the gain bandwidth $GB_{int}$ of the integrator 10 is 50 Hz.

Next, a pole and a zero are provided in the current loop phase compensation device 12 configuring the current control stage, and thus, the zero and the pole of the output stage are offset, respectively. The first pole frequency $f_{Ap1}$ of the current control stage is set to a value that is approximately identical to the zero frequency $f_{Az0}$ of the output stage (Expression (6)), and the first zero frequency $f_{Az1}$ of the current control stage is set to a value that is approximately identical to the voltage control unity gain frequency $f_{Vu}$ of the output stage (Expression (7)).

$$f_{Ap1} = f_{Az0} \quad (6)$$

$$f_{Az1} = f_{Vu} \quad (7)$$

Further, a second pole frequency $f_{Ap2}$ is set to be a value that is higher than the unity gain frequency $f_{Au}$ of the current feedback control loop and is lower than the switching frequency $f_{SW}$ such that the current feedback control is not unstable due to a noise associated with the switching operation (Expression (8)).

$$f_{Au} < f_{Ap2} < f_{SW} \quad (8)$$

The preparation has been completed, and thus, three resistances $R_{A0}$, $R_{A1}$, and $R_{A2}$ and two capacitances $C_{A1}$ and $C_{A2}$ that configure the current loop phase compensation device 12 are set. The first pole frequency $f_{Ap1}$ of the control stage is set by the product of the resistance $R_{A1}$ and the capacitance $C_{A1}$ (Expression (9)).

$$1/2\pi R_{A1} \cdot C_{A1} = f_{Ap1} \quad (9)$$

In addition, a ratio ($R_{A1}/R_{A0}$) of two resistances is set by the gain $G_{Ap1}$ at the first pole frequency $f_{Ap1}$ of the control stage, the first pole frequency $f_{Ap1}$, the gain bandwidth $GB_{int}$ of the integrator 10, and the low-frequency gain $G_{A0}$ of the output stage (Expression (10)).

[Expression 4]

$$\frac{R_{A1}}{R_{A0}} = \frac{G_{Ap1} \cdot f_{Ap1}}{GB_{int}} \quad (10)$$

$$= \frac{f_{Au}}{G_{A0} \cdot f_{Ap1}} \cdot \frac{f_{Ap1}}{GB_{int}}$$

$$= \frac{f_{Au}}{G_{A0} \cdot GB_{int}}$$

Then, the first zero frequency $f_{Az1}$ of the control stage is set by the resistance $R_{A2}$ and the capacitance $C_{A2}$ (Expression (11)).

$$1/2\pi \cdot R_{A2} \cdot C_{A2} = f_{Az1} \quad (11)$$

Finally, the second pole frequency $f_{Ap2}$ is set by two resistances $R_{A1}$ and $R_{A2}$, and the capacitance $C_{A2}$ (Expression (12)).

[Expression 5]

$$\frac{1}{2\pi \cdot (R_{A1} \| R_{A2}) \cdot C_{A2}} = f_{Ap2} \quad (12)$$

Four relational expressions are provided with respect to five parameters ($R_{A0}$, $R_{A1}$, $R_{A2}$, $C_{A1}$, and $C_{A2}$), and thus, there are one more freedom degree. Therefore, the case of being mounted on an integrated circuit is assumed, and for example, the capacitance $C_{A1}$ is set to 0 pF. Accordingly, from Expression (9), a resistance value of the resistance $R_{A1}$ (for descriptive purposes, $R_{A1}$ is used) is set as $R_{A1} = 1/(2\pi \times 50 \text{ pF} \times 1.1 \text{ kHz}) = 3 \text{ M}\Omega$.

In addition, from Expression (10), a resistance value of the resistance $R_{A0}$ (for descriptive purposes, $R_{A0}$ is used) is set as $R_{A0} = 3 \text{ M}\Omega \times 1 \times 50 \text{ Hz}/18 \text{ kHz} = 8.3 \text{ k}\Omega$). Then, from Expression (11), the third resistance value $R_{A3}$ is $R_{A3} = 1/(2\pi \times 50 \text{ pF} \times 18 \text{ kHz}) = 180 \text{ k}\Omega$, and finally, from Expression (12), in a case where the second pole frequency $f_{Ap2}$ is 100 kHz, the second capacitance $C_{A2}$ is set to $C_{A2} = 1/(2\pi \times 100 \text{ kHz} \times (3 \text{ M}\Omega \| 180 \text{ k}\Omega)) = 9.4 \text{ pF}$.

As described above, in the current feedback control loop, an optimal constant of elements configuring the integrator 10 and the current loop phase compensation device 12 can be obtained by calculation.

For example, in the overcurrent protection operation, in the case of performing control in which the voltage control loop is turned off, it is difficult to expect the behavior of an output power source voltage when the overcurrent protection function is operated. In contrast, in this embodiment, the output voltage $V_{OUT}$ at the time of the overload state is stable, and the voltage is set in accordance with the load, and thus, the value thereof can be expected. In addition, when the load returns to the normal state, the output power source voltage rapidly returns to the voltage set in advance, and the overshoot does not occur after the return. Note that, even in the voltage feedback control loop, similarly, the optimal value of the elements configuring the voltage loop phase compensation device 6 can be obtained by calculation.

Third Embodiment

Figure 5:
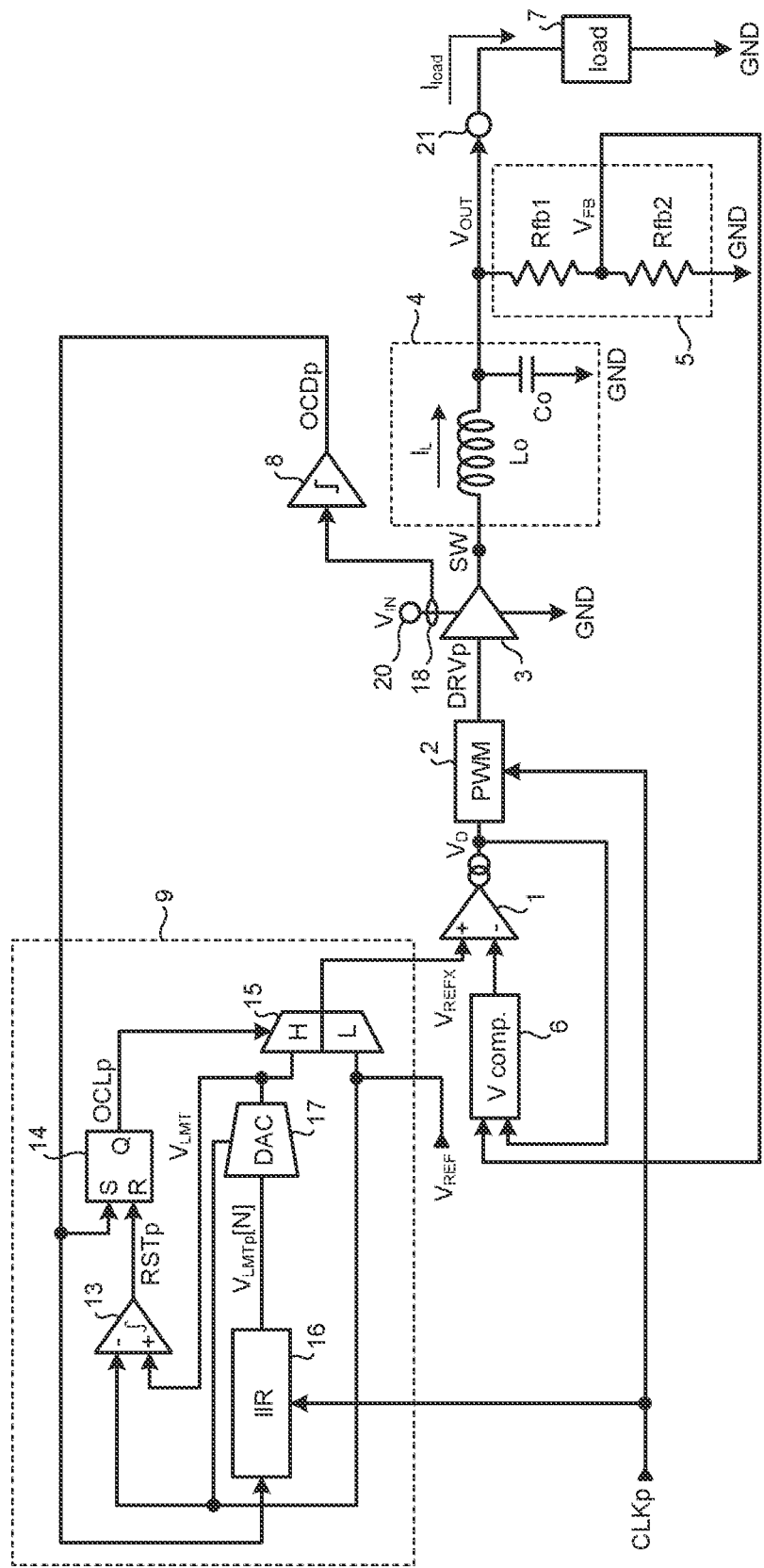
FIG. 5 is a diagram illustrating a configuration of a switching power circuit of a third embodiment.

FIG. 5 is a diagram illustrating a switching power circuit of a third embodiment. The overcurrent protection circuit 9 includes a phase compensation digital filter 16 and a D/A converter 17.

The phase compensation digital filter 16 receives the overcurrent sensing signal OCDp that is a digital signal of 1 bit output from the overcurrent sensing device 8, and updates an internal register at the timing of the clock signal CLKp. The phase compensation digital filter 16 outputs a reference voltage digital signal of approximately 12 bits to 16 bits to the D/A converter 17.

Figure 6:
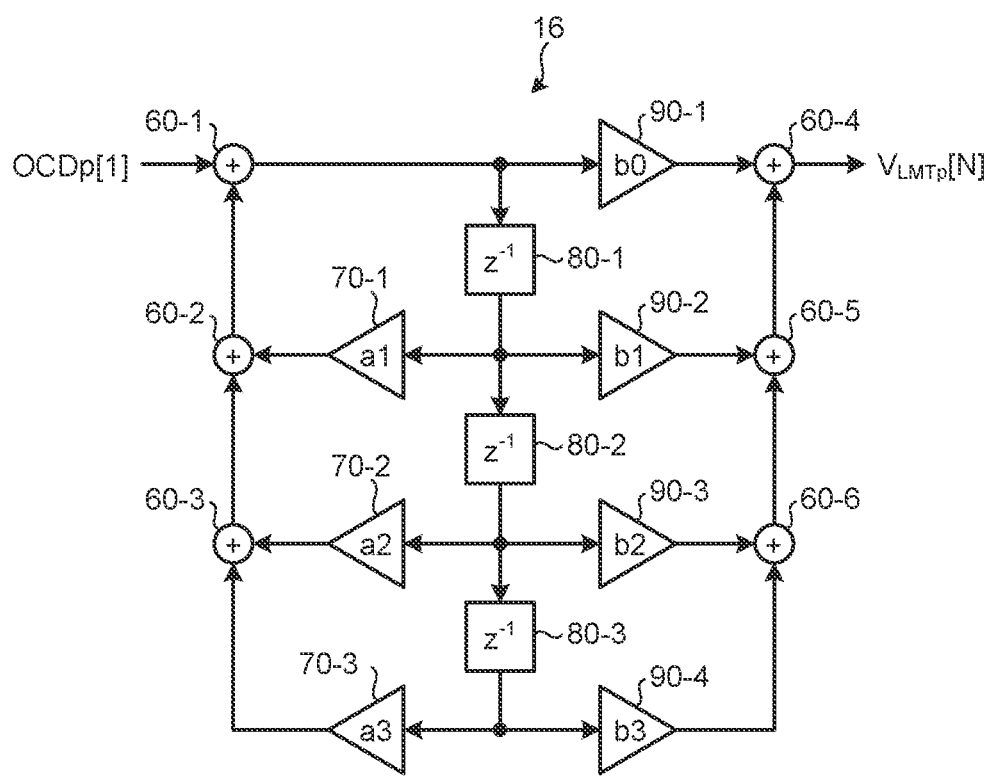
FIG. 6 is a diagram illustrating one example of a digital filter.

The phase compensation digital filter 16 is referred to as an infinite impulse response (IIR) digital filter, and a configuration example thereof is illustrated in FIG. 6. FIG. 6 illustrates a tertiary filter in which a digital signal $V_{LMTp}[N]$ of N bits is obtained from the overcurrent sensing signal OCDp of 1 bit by a product-sum operation, and is output.

The phase compensation digital filter 16 includes adders 60-1 to 60-6, accumulators 70-1 to 70-3 having coefficients a1 to a3, registers 80-1 to 80-3, and accumulators 90-1 to 90-4 having coefficients b0 to b3. The registers 80-1 to 80-3 incorporate and output data at a start-up timing of the clock signal CLKp. The values of the coefficients a1 to a3 and b0 to b3 are set, and thus, it is possible to attain a filter having various properties.

Here, the transfer function $G_A(s)$ of the overcurrent protection circuit 9 of the second embodiment including the integrator 10 and the current loop phase compensation device 12 is represented as Expression (13).

[Expression 6]

$$G_A(s) = \frac{G_{Ap} \cdot \left(1 + \frac{s}{\omega_{AZ1}}\right)}{\left(1 + \frac{s}{\omega_{Ap}}\right) \cdot \left(1 + \frac{s}{\omega_{Ap1}}\right) \cdot \left(1 + \frac{s}{\omega_{Ap2}}\right)} \cdot \frac{V_{REF}}{I_{lmt}} \quad (13)$$

Here, $\omega_{Ap}$ is an angular frequency of the main pole frequency $f_{Ap}$, and $\omega_{Ap}=2\pi \cdot f_{Ap}$ is obtained. Similarly, $\omega_{Ap1}=2\pi \cdot f_{Ap1}$ is obtained, $\omega_{Ap2}=2\pi \cdot f_{Ap2}$ is obtained, and $\omega_{Az1}=2\pi \cdot f_{Az1}$ is obtained. In addition, $T_{SW}$ is a switching cycle of the clock signal CLKp, and $T_{SW}=1/f_{SW}$ is obtained.

Next, s is substituted with z by applying a bilinear transform (Expression (14)).

[Expression 7]

$$s = \frac{2}{T_{SW}} \cdot \frac{1-z^{-1}}{1+z^{-1}} \quad (14)$$

Then, the values of the coefficients a1, a2, a3, b0, b1, b2, and b3 that are properties equivalent to the transfer function $G_A(s)$ of the overcurrent protection circuit 9 of the second embodiment can be obtained (Expression (15)).

[Expression 8]

$$G_A(z) = \frac{b0 + b1 \cdot z^{-1} + b2 \cdot z^{-2} + b3 \cdot z^{-3}}{a1 \cdot z^{-1} + a2 \cdot z^{-2} + a3 \cdot z^{-3}} \quad (15)$$

As described above, in a case where the output capacitance Co, the limited current $I_{LMT}$, the output voltage $V_{OUT}$, the fixed reference voltage $V_{REF}$, the voltage control unity gain frequency $f_{Vu}$, and the switching frequency $f_{SW}$ are set, it is possible to design the optimal phase compensation digital filter 16.

The first pole frequency $f_{Ap1}$ may be lower than 1 kHz, in accordance with the condition. In this case, in an analog circuit, the capacitance and the resistance configuring the current loop phase compensation device 12 increase, and thus, a mounting area of an integrated circuit increases, and the cost increases. In the case of the phase compensation digital filter 16, it is possible to handle the problem by increasing the number of bits of a computing unit, and it is possible to suppress an increase in the cost, compared to the case of using the analog filter.

According to this embodiment, it is possible to configure the switching power circuit having the overcurrent protection function, in which the protection voltage $V_{LMT}$ that is changed in accordance with the overcurrent sensing signal OCDp is generated by the phase compensation digital filter 16 and the D/A converter 17, by suppressing the cost. Note that, the current loop phase compensation device 12 may be configured of a finite impulse response (FIR) type digital filter without being limited to an IIR type digital filter.

Fourth Embodiment

Figure 7:
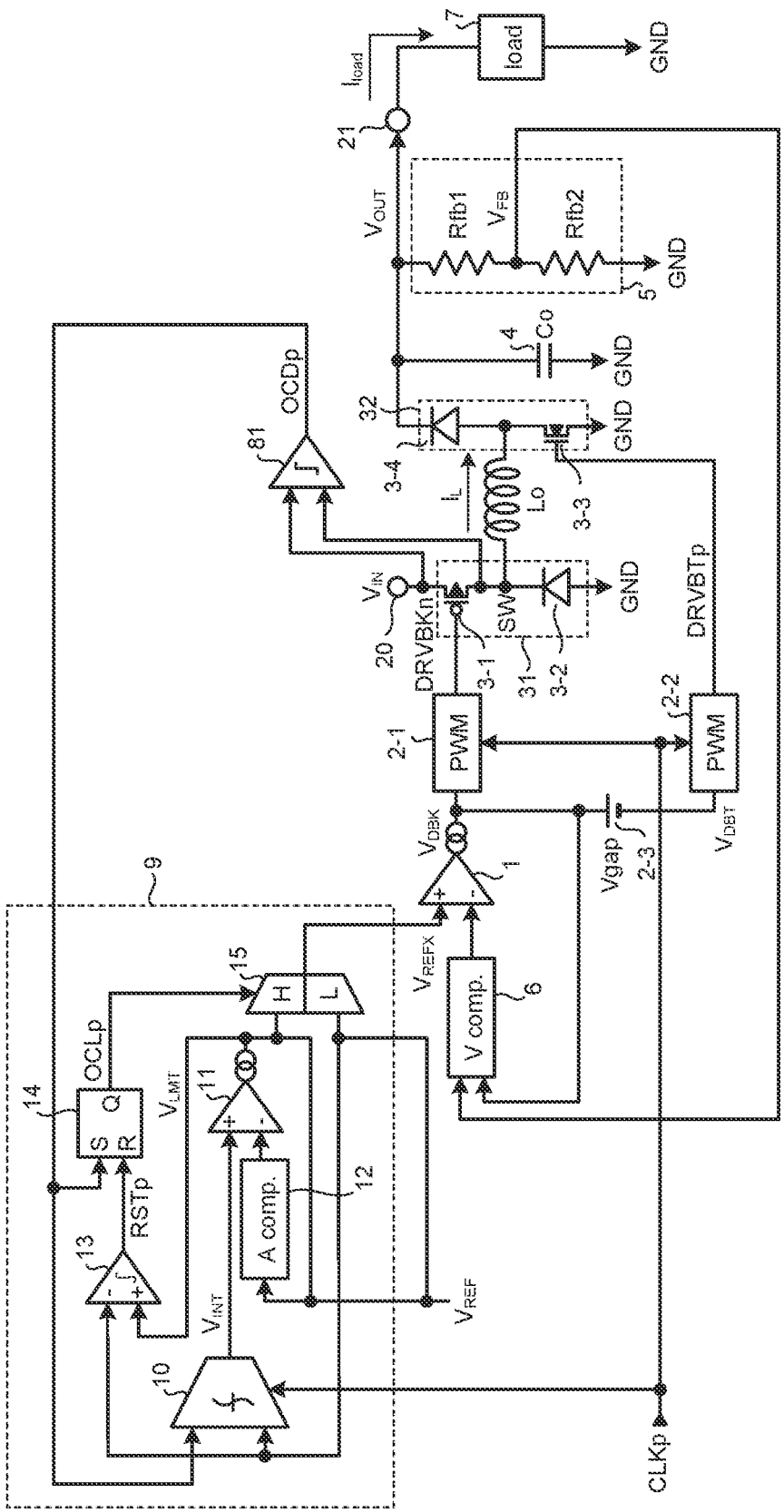
FIG. 7 is a diagram illustrating a configuration of a switching power circuit of a fourth embodiment.

FIG. 7 is a diagram illustrating a switching power circuit of a fourth embodiment. This embodiment is a step-up/down type switching power circuit. This embodiment includes a step-down driver circuit 31 in which a PMOS transistor 3-1 and a rectification diode 3-2 are connected in series between the input terminal 20 to which the input voltage $V_{IN}$ is applied and the ground GND. The configuration of the step-down driver circuit 31 can be used as the configuration of the driver circuit 3 of the step-down type switching power circuit described above.

In the PMOS transistor 3-1, the input terminal 20 is connected to a source, and the node SW is connected to a drain. In addition, in the PMOS transistor 3-1, a step-down drive signal DRVBKn from a step-down pulse width modulator 2-1 is applied to a gate, and On/Off of the PMOS transistor 3-1 is controlled. The step-down pulse width modulator 2-1 generates the step-down drive signal DRVBKn in response to the clock signal CLKp and a step-down instruction voltage $V_{DBK}$.

The step-up driver circuit 32 includes a rectification diode 3-4 and an NMOS transistor 3-3 that are connected in series between the output terminal 21 and the ground GND. In the NMOS transistor 3-3, a source is connected to the ground GND, and one end of the inductor Lo is connected to a drain. In addition, in the NMOS transistor 3-3, a step-up drive signal DRVBTp from a step-up pulse width modulator 2-2 is applied to a gate, and On/Off of the NMOS transistor 3-3 is controlled. The step-up pulse width modulator 2-2 generates the step-up drive signal DRVBTp in response to the clock signal CLKp and a step-up instruction voltage $V_{DBT}$ that is supplied from the step-down instruction voltage $V_{DBK}$ through a gap voltage source 2-3. In the rectification diode 3-4, one end of the inductor Lo is connected to an anode, and the output terminal 21 is connected to a cathode.

A source and drain path that is a main current path of the PMOS transistor 3-1 is connected in series between the input terminal 20 and the output terminal 21 through the inductor Lo and the rectification diode 3-4.

A sensing circuit 81 senses source and drain voltages of the PMOS transistor 3-1, and senses the overcurrent state. A source-drain voltage of the PMOS transistor 3-1 is a voltage that is proportional to a drain current by an on resistance. The sensing circuit 81 outputs the overcurrent sensing signal OCDp that is at Hi when a voltage between the source and the drain of the PMOS transistor 3-1 is greater than a predetermined threshold value.

The latch circuit 14 sets the overcurrent protection signal OCLp at Hi, in response to the overcurrent sensing signal OCDp, and resets the overcurrent protection signal OCLp at Low in a case where the protection voltage $V_{LMT}$ is greater than the fixed reference voltage $V_{REF}$. In a case where the overcurrent protection signal OCLp is at Hi, the selection switch 15 selects the protection voltage $V_{LMT}$ of the integrator 10 that is changed in accordance with the number of times of the overcurrent sensing signal OCDp, and supplies the protection voltage to the error amplifier 1. Accordingly, the voltage of the step-down instruction voltage $V_{DBK}$ that is output from the error amplifier 1 decreases in accordance with the protection voltage $V_{LMT}$, and thus, the voltage of the step-up instruction voltage $V_{DBT}$ also decreases, and the output voltage Vout decreases. Accordingly, the switching power circuit decreases the output voltage $V_{OUT}$, and enters a constant current operation. In a case where the overcurrent protection signal OCLp is at Low, the selection switch 15 selects the fixed reference voltage $V_{REF}$ and supplies the fixed reference voltage $V_{REF}$ to the error amplifier 1. According to such a selection operation, the switching power circuit enters a constant voltage operation.

Figure 8:
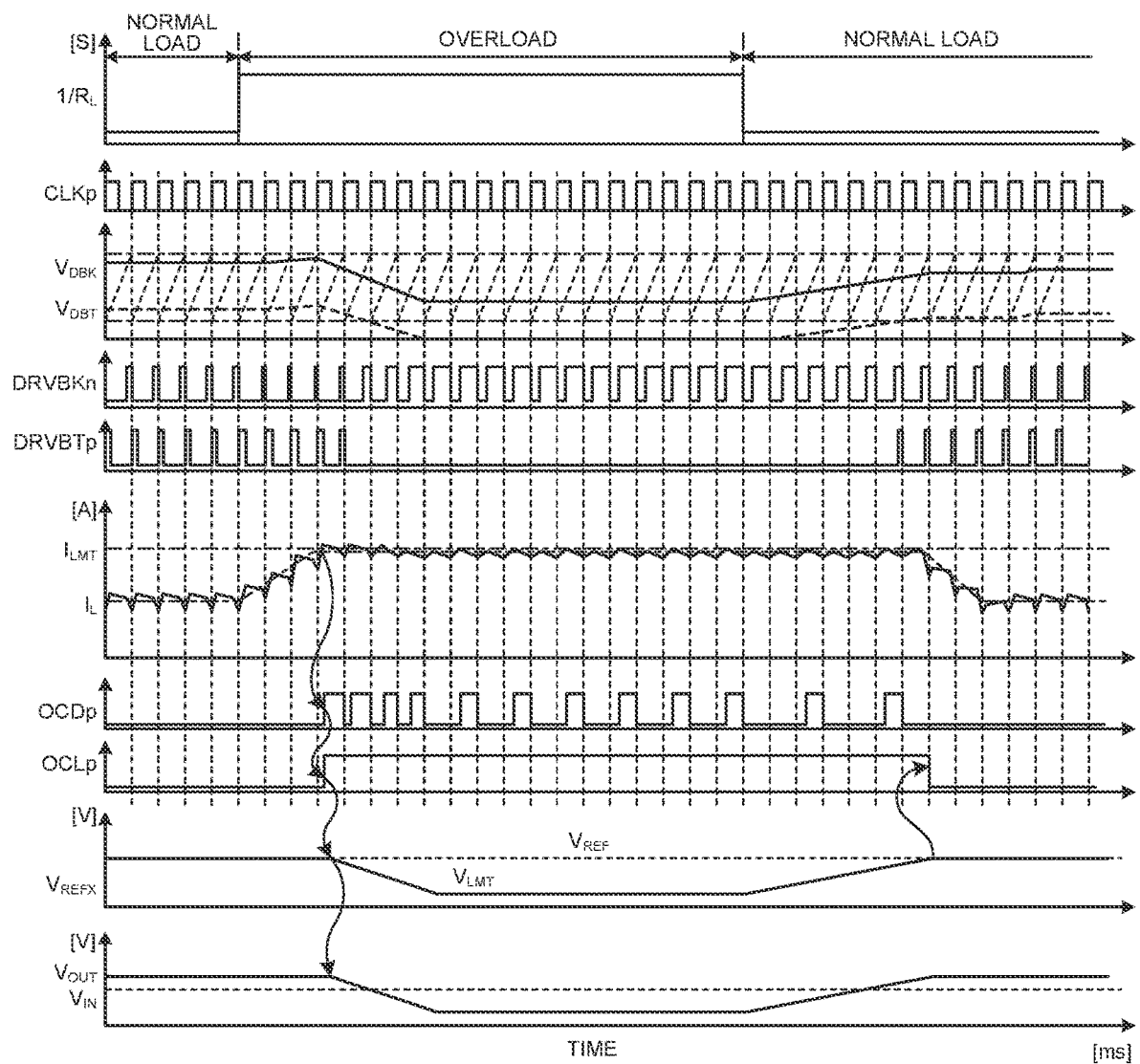
FIG. 8 is a waveform diagram schematically illustrating an operation of the switching power circuit of the fourth embodiment.

FIG. 8 is a diagram illustrating a schematic waveform illustrating the operation of the fourth embodiment. The load $(1/R_L)$ is illustrated on the first line. For descriptive purposes, a case is illustrated in which the load is suddenly changed to the overload state from a normal load state at a certain time point, and after that, returns to the normal load state.

The clock signal CLKp that is the source of the switching operation is illustrated on the next line. The step-down instruction voltage $V_{DBK}$ (a solid line), and the step-up instruction voltage $V_{DBT}$ (a broken line) of which the voltage is $V_{gap}$ lower than that of the step-down instruction voltage are illustrated on the next line. In addition, a sawtooth wave signal (a dotted line) that is synchronized with the start-up timing of the clock signal CLKp is illustrated. The voltages of the step-down instruction voltage $V_{DBK}$ and the step-up instruction voltage $V_{DBT}$ are maintained within an amplitude range of the sawtooth wave signal at the time of the normal load, by the function of the voltage feedback control loop. However, in a case where the load is in the overload state, it is sensed that the voltage of the output voltage $V_{OUT}$ slightly decreases, and the voltages of the step-down instruction voltage $V_{DBK}$ and the step-up instruction voltage $V_{DBT}$ slightly increase. In a case where the inductor current $I_L$ decreases after the overload state is sensed, the voltages of the step-down instruction voltage $V_{DBK}$ and the step-up instruction voltage $V_{DBT}$ are stable such that the value of the inductor current $I_L$ is maintained at the limited current $I_{LMT}$.

The step-down drive signal DRVBKn is illustrated on the next line, and the step-up drive signal DRVBTp is illustrated on the next line. A duty ratio of the step-down drive signal DRVBKn and a duty ratio of the step-up drive signal DRVBTp are smoothly changed in accordance with the control of the step-down instruction voltage $V_{DBK}$ and the control of the step-up instruction voltage $V_{DBT}$, respectively. The voltages of the step-down instruction voltage $V_{DBK}$ and the step-up instruction voltage $V_{DBT}$ increase, and thus, the Hi period of the step-down drive signal DRVBKn shortens, and the Low period of the step-down drive signal DRVBKn lengthens. For this reason, a turn-on time of the PMOS transistor 3-1 lengthens, and the inductor current $I_L$ increases. In a case where the v0 voltage of the step-up instruction voltage $V_{DBT}$ is lower than a bottom voltage of the sawtooth wave signal, only a step-down switching operation of the step-down drive signal DRVBKn is performed.

The inductor current $I_L$ is illustrated by a solid line, and the average value thereof is illustrated by a broken line, on the next line. The inductor current $I_L$ increases or decreases in accordance with the switching operation, but the average value is constantly stable in accordance with the size of load. In addition, control for limiting the inductor current $I_L$ to the limited current $I_{LMT}$ is performed by the function of the current feedback control loop, at the time of the overload state.

The overcurrent sensing signal OCDp is illustrated on the next line. The overcurrent sensing signal OCDp is a pulse signal that is at Hi in a case where the inductor current $I_L$ is greater than the limited current $I_{LMT}$ during the switching operation. An occurrence frequency thereof reacts to a slight fluctuation in the switching operation according to the function of the current feedback control loop, and the overcurrent sensing signal OCDp is at Hi every time when the inductor current $I_L$ is greater than the limited current $I_{LMT}$. Accordingly, the overcurrent sensing signal OCDp increases in a case where the inductor current $I_L$ increases to be a value close to the limited current $I_{LMT}$, and decreases in a case where the inductor current $I_L$ decreases, and there is a margin with respect to the limited current $I_{LMT}$.

The overcurrent protection signal OCLp is illustrated on the next line. In a case where the overcurrent sensing signal OCDp is at Hi, the overcurrent protection signal OCLp is set at Hi, and in a case where the protection voltage $V_{LMT}$ is greater than the fixed reference voltage $V_{REF}$, the overcurrent protection signal OCLp is reset at Low.

The reference voltage signal $V_{REFX}$ is illustrated on the next line. The reference voltage signal $V_{REFX}$ is switched to the protection voltage $V_{LMT}$ that is changed in accordance with the load current $I_{load}$, from the fixed reference voltage $V_{REF}$, in a case where the inductor current $I_L$ is greater than the limited current $I_{LMT}$, the overcurrent state is set, and is returned to the fixed reference voltage $V_{REF}$ in a case where the inductor current $I_L$ decreases, and the normal load state is set.

The input voltage $V_{IN}$ is illustrated by a broken line, and the output voltage $V_{OUT}$ is illustrated by a solid line, on the last line. In the step-up/down type switching power circuit, the voltage of the output voltage $V_{OUT}$ is set to be slightly higher than the voltage of the input voltage $V_{IN}$. In the normal load state, the output voltage $V_{OUT}$ is maintained at the set value.

In a case where the overload state is set, the voltage of the output voltage $V_{OUT}$ starts to decrease after several times of switching operations, by the voltage feedback control in which the reference voltage signal $V_{REFX}$ to be applied to the error amplifier 1 decreases in accordance with the number of times that the overcurrent sensing signal OCDp is detected. The inductor current $I_L$ flowing to the inductor Lo is decreased by a decrease in the output voltage $V_{OUT}$. According to the voltage feedback control based on a comparison operation between the inductor current $I_L$ and the limited current $I_{LMT}$, control is performed in which the output voltage in the overload state is identical to the protection voltage $V_{LMT}$, and the output voltage $V_{ouT}$ is maintained to be constant. After that, in a case where the load decreases, and the normal load state is set, the overcurrent protection operation ends, the output voltage $V_{OUT}$ increases, and the voltage feedback control is performed in which the feedback voltage $V_{FB}$ is identical to the fixed reference voltage $V_{REF}$.

According to this embodiment, in a case where the overload state is set, and the output voltage $V_{OUT}$ decreases, the error amplifier 1 responds to a decrease in the output voltage, and thus, the voltages of the step-down instruction voltage $V_{DBK}$ and the step-up instruction voltage $V_{DBT}$ increase such that the output voltage $V_{OUT}$ increases. After that, in a case where the overcurrent sensing device 8 senses the overcurrent state, the voltage of the reference voltage signal $V_{REFX}$ is decreased by the current feedback control. The error amplifier 1 responds to a decrease in the voltage of the reference voltage signal $V_{REFX}$, and thus, the voltages of the step-down instruction voltage $V_{DBK}$ and the step-up instruction voltage $V_{DBT}$ decrease.

The output voltage $V_{OUT}$ decreases, and thus, the load current $I_{load}$ decreases. Then, the current feedback control loop is stable in a state where a peak value of the inductor current $I_L$ is identical to the limited current $I_{LMT}$. At this time, the voltage feedback control loop is also operated, and the output voltage $V_{OUT}$ is also stable. After that, in a case where the load returns to the normal state, the control of the output voltage $V_{OUT}$ is switched to the control based on the fixed reference voltage $V_{REF}$ from the control based on the protection voltage $V_{LMT}$, and thus, the output voltage $V_{OUT}$ increases. At this time, an increase rate is stable by the function of the current feedback control loop. Further, in a case where the output voltage $V_{OUT}$ reaches the set value, the operation is rapidly switched to the constant voltage operation, and thus, the output voltage does not greatly exceed the set value. This is because the voltage feedback control loop for controlling the output voltage $V_{OUT}$ by the reference voltage signal $V_{REFX}$ is constantly operated even at the time of the overcurrent protection operation, and thus, when the state of the overcurrent protection is switched to a normal operation, it is not necessary to perform control in which the voltage control loop is returned.

In addition, in this embodiment, in a case where the overload state is set, as described above, the output voltage $V_{OUT}$ is controlled such that the peak value of the inductor current $I_L$ is identical to the limited current $I_{LMT}$, and thus, is stable, by the function of the current feedback control loop. At this time, the duty ratios of the step-down drive signal DRVBKn and the step-up drive signal DRVBTp are controlled such that the output voltage $V_{OUT}$ is stable, by the function of the voltage feedback control loop.

In the case of the step-up/down type switching power circuit, the switching operation is changed to a step-up/down operation from a step-up operation, and to a step-down operation, in accordance with a voltage relationship between the output voltage $V_{OUT}$ and the input voltage $V_{IN}$. The step-up/down type switching power circuit of this embodiment suitably proceeds to the step-up operation, the step-up/down operation, or the step-down operation, in accordance with a change in the voltage of the output voltage $V_{OUT}$ at the time of the overload state. Therefore, in a case where the load is extremely heavy, the output voltage $V_{OUT}$ is lower than the input voltage $V_{IN}$, and the step-down operation is set. At this time, the load current $I_{load}$ is approximately identical to the limited current $I_{LMT}$. When the load returns to the normal state, and the control for allowing the output voltage $V_{OUT}$ to follow the fixed reference voltage $V_{REF}$ is performed, the peak value of the inductor current $I_L$ is controlled such that the peak value is identical to the limited current $I_{LMT}$, by the function of the current feedback control loop. At this time, the switching operation of the power circuit of this embodiment is controlled in accordance with the output voltage $V_{OUT}$, by the function of the voltage feedback control loop, and is maintained such that the maximum current efficiency is obtained. In addition, the voltage feedback control loop is constantly operated, and thus, when the load returns to the normal state, the output voltage $V_{OUT}$ is stable and instantaneously returns to the normal state without the overshoot. In addition, in this embodiment, the inductor current $I_L$ increases or decreases for each switching cycle, but a ripple current thereof is kept small, and thus, is stable.

As described above, according to this embodiment, it is possible to provide a safe step-up/down type switching power circuit that is stably operated even at the time of the overload state, and also optimally controls a return operation with respect to the normal load state.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A switching power circuit, comprising:
    a first switching transistor in which a main current path is connected between an input terminal to which a direct-current input voltage is applied and an output terminal supplying an output voltage;
    an inductor that is connected between the switching transistor and the output terminal;
    a first PWM signal generation circuit that generates a first PWM signal of which a duty ratio is changed in accordance with a first control voltage based on a control voltage output from a differential amplifier circuit comparing a reference voltage with a feedback voltage of the output voltage;
    a first rectification diode that is connected in a forward direction towards the first switching transistor from a ground;
    a second rectification diode that is connected in the forward direction towards the output terminal from the inductor;
    a second switching transistor that is connected between an anode of the second rectification diode and the ground;
    a second PWM signal generation circuit that generates a second PWM signal of which a duty ratio is changed in accordance with a second control voltage based on the control voltage, and which is applied to a gate of the second switching transistor; and
    an overcurrent protection circuit that decreases a voltage of the reference voltage in a case where an output current of the first switching transistor is greater than a set current.

2. The switching power circuit according to claim 1, further comprising
    a sensing circuit that senses a voltage between a source and a drain of the first switching transistor.

3. The switching power circuit according to claim 1,
    wherein the second control voltage that is supplied to the second PWM signal generation circuit is lower as a predetermined voltage than the first control voltage that is supplied to the first PWM signal generation circuit.

4. The switching power circuit according to claim 1,
    wherein in a case where the output current is greater than the set current, the reference voltage is switched to a variable reference voltage that is changed in accordance with the output current, from a fixed voltage.

5. The switching power circuit according to claim 4,
    wherein in a case where the variable reference voltage is higher than the fixed voltage, the reference voltage is switched to the fixed voltage.

6. The switching power circuit according to claim 1, further comprising
    an integrator that has a capacitance in which charge and discharge are controlled in accordance with the number of times the output current is greater than the set current, and generates the variable reference voltage.

7. The switching power circuit according to claim 1, further comprising
    a differential amplifier circuit that outputs a control voltage according to a differential voltage between the reference voltage and the feedback voltage,
    wherein the feedback voltage is supplied to a first input end of the differential amplifier circuit through a first compensation circuit, and
    the feedback voltage is supplied to a second input end of the differential amplifier circuit through a second compensation circuit.

8. The switching power circuit according to claim 7,
    wherein the first phase compensation circuit is a two-pole one-zero type filter.

* * * * *